Aug. 28, 1956 G. V. WOODLING 2,760,797
WELDABLE STUD ELEMENT
Filed Aug. 18, 1951

INVENTOR.
BY George V. Woodling

United States Patent Office 2,760,797
Patented Aug. 28, 1956

2,760,797

WELDABLE STUD ELEMENT

George V. Woodling, Rocky River, Ohio

Application August 18, 1951, Serial No. 242,539

13 Claims. (Cl. 287—20.2)

My invention relates to studs which are adapted to be electrically welded to a plate or other metal part.

An object of my invention is the provision of a weldable stud having a centering tip extending through a cap which holds flux in the end of the stud.

Another object of the invention is the provision of a weldable steel or iron stud having a pin in an end thereof extending through the cap, the pin and cap being preferably made of metal having a lower melting point and a greater conductivity than that of the steel or iron stud and being of the class including at least magnesium, copper, aluminum, tin, silver, zinc, gold, lead, lithium, beryllium, antimony, and their alloys.

Another object of the invention is the provision of a weldable stud having at an end thereof a readily fusible or volatilizable metal different from that of the stud to aid in establishing an arc.

Another object of my invention is the provision of a weldable stud in which the centering tip comprises an integral part of the stud and is adapted to hold a cap on the end of the stud for confining flux in an annular recess surrounding the centering tip.

A further object of my invention is the provision of a weldable stud having an end surface which facilitates welding of large diameter studs to a plate or other metal part.

Another object of my invention is the provision of a weldable stud having in the end thereof a plurality of annular recesses containing flux separated by at least a metal partition.

Another object of my invention is the provision of separating the flux in order to prevent a large pool or quantity of flux from freely flowing over the entire end surface of a large stud.

A further object of my invention is the provision of a centering tip which, when it burns away, releases the metal cap which holds the flux in the recess.

Other objects and a fuller understanding of this invention may be had by referring to the following description and claims, taken in conjunction with the accompanying drawings, in which:

The studs shown and described herein are particularly adaptable for use in my welding device disclosed in my pending application Serial No. 489,472 which is a continuation-in-part of my application Serial No. 242,540, filed August 18, 1951, now abandoned, in which the welding arc is magnetically controlled to cause it to rotate with rapid speed in a circular or annular path between the end of the stud and the plate to which the stud is being welded.

Figures 3, 4:
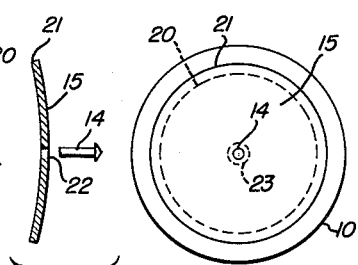
Figure 3 is a cross-sectional view of a cap and pin preparatory to mounting same on the end of the weldable stud in Figure 2.
Figure 4 is an enlarged end view of the finished stud in Figure 1.

With reference to Figures 1 to 4, inclusive, the stud is illustrated by the reference character 10 and is provided with a threaded portion 11 which may be of any suitable length and size to accommodate the purpose for which it is to be used and is preferably made of steel or iron. The welding end of this stud is indicated by the reference character 12 and comprises an annular recess 13 for confining flux material 16 over which a cap 15 is mounted to confine the flux in the recess. The annular recess 13 is provided with an annular shoulder 20 against which the outer annular edge 21 of the cap 15 fits. The center of the cap 15 is provided with an aperture 22 through which a centering pin 14 is mounted to hold the cap 15 on the end of the stud. After the annular recess 13 is filled with flux material and after the cap 15 is mounted over the recess, the pin 14 is inserted through the aperture 22 and driven or pressed into a hole 17 to secure the cap to the end of the stud for confining the flux in the annular recess. As shown in Figure 3, the cap 15 is preferably bowed so that when it is secured to the end of the stud, the outer annular edge 21 makes a firm pressure fit within the annular shoulder 20. As shown best in Figure 2, the center portion of the stud constitutes a shoulder or anvil 23 against which the cap rests during the operation of driving in the centering pin 14. The centering pin has a tip of a size as to fit in a punch mark, which facilitates the centering of the stud on a plate or other metal part to which the stud is to be welded.

The electrical arc is initially struck at the centering pin 14, but the moment it is struck the arc becomes magnetically controlled, whereby it is caused to move outwardly toward the outer peripheral surface of the end of the stud so that a complete and sound weld is effected between the outer peripheral end surface and the plate to which the stud is welded. The centering pin 14 and the shoulder portion 23 burn away sufficiently as to permit the stud during the last stages of its welding operation to be forcibly pressed against a plate against which it is being welded to make a firm weld. Also, the burning away of the pin 14 releases the cap 15. The centering pin 14 is preferably of a different metal from the stud, which is very beneficial to the welding operation as this makes it much easier to strike the arc. As the arc moves from the centering pin to the outer peripheral end of the stud, the welding cap is melted away and the arc has the opportunity of either going across the welding cap or following the bottom of the recess as it moves from the center of the stud to the outer peripheral end surface. The centering pin is preferably made of metal having a lower melting point and a greater conductivity than that of the steel or iron stud and being of the class including at least magnesium, copper, aluminum, tin, silver, zinc, gold, lead, lithium, beryllium, antimony, and their alloys. The cap 15 may be made of similar metals as the pin 14. In the case of the centering pin or cap being made of magnesium, the metal becomes readily fusible and quickly volatilizes to aid in establishing an arc. The pin 14 may be of a suitable design to firmly stay in the hole 17 and the shank part which is driven or pressed into the hole may be provided with raised ribs, driveable screw threads or other anchoring means.

Figure 5:
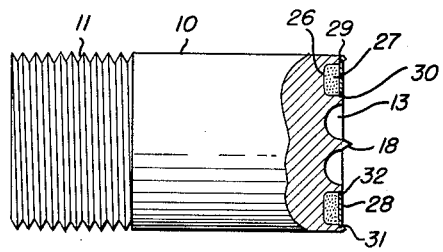
Figure 5 is a modified form of a stud embodying the features of my invention.
Figure 6:
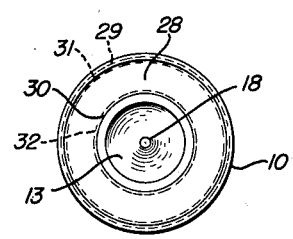
Figure 6 is an end view of Figure 5.

With reference to Figures 5 and 6, I show a modification of the end of the stud in that the invention has a particular application to a larger diameter stud. In Figures 5 and 6, a centering tip 18 is integral with the stud and is surrounded by the annular recess 13, but in this modification the annular recess is not filled with flux material. Spaced outwardly from the annular recess 13 is a second recess 26 which is filled with flux 27 covered by an annular cap 28. The annular cap 28 has outer and inner annular edges 29 and 30, which fit respectively in outer and inner annular shoulders 31 and 32. The annular cap 28 may be held by spinning or annularly crimping the outer peripheral edge of the stud to press the outer annular shoulder 31 against the outer annular edge 29. In Figures 5 and 6, the arc is first struck at the centering tip 18 and moves outwardly of the end surface of the stud until it comes into contact with the cap 28 and the flux 27, at which place the arc magnetically rotates with rapid speed in a circular or spiral path between the outer peripheral end of the stud and the plate to which the stud is to be welded.

Figure 1:
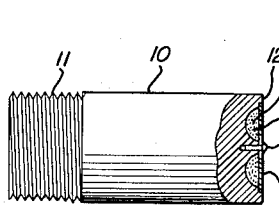
Figure 1 is a side view of a stud embodying the features of my invention, parts being shown in section to better illustrate the construction of the end of the stud.
Figure 2:
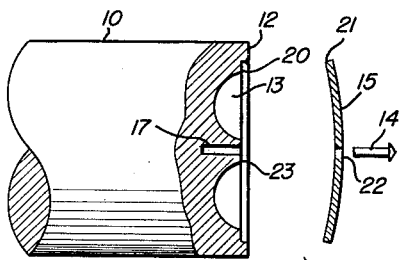
Figure 2 is an enlarged view of the stud shown in Figure 1 preparatory to mounting the cap and pin thereon.
Figure 7:
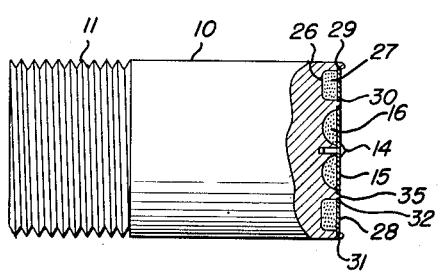
Figure 7 is a further modified form of the invention.
Figure 8:
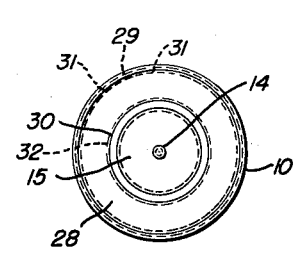
Figure 8 is an end view of Figure 7.

Figures 7 and 8 show a further modified form of the invention in that they combine the disclosure of Figure 1 with that of Figure 5 and the reference characters apply to Figures 7 and 8 the same as they apply to Figures 1 and 5. Thus, in Figure 7, of which Figure 8 is an end view, the recess 13 and recess 26 are both filled with flux. In this particular embodiment, the flux in the annular recesses 13 and 26 are separated by a metal partition or annular wall 35. In this manner the flux is separated and is thus prevented from making a large pool as would otherwise be the case in the absence of the separating partition 35.

Figure 9:
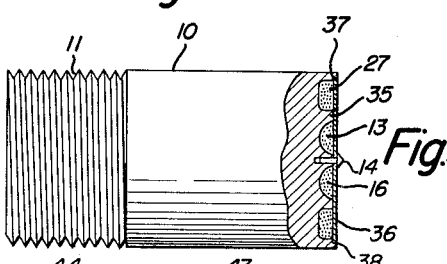
Figure 9 is a still further modified form of the invention.
Figure 10:
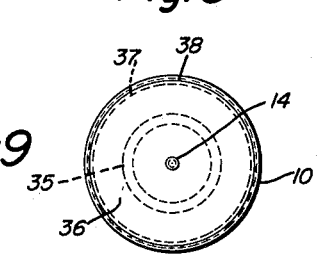
Figure 10 is an end view of Figure 9.

In Figures 9 and 10, I show a further modification in that the end of the cap is provided with the same annular recesses 13 and 26 but only one cap 36 is employed to hold the flux in both of the recesses. The annular partition 35 in Figure 9 is fore-shortened to permit the single cap 36 to extend outwardly and cover the annular recess 26. As shown in Figure 9, the annular recess is provided with an outer annular shoulder 37 against which the outer annular edge 38 of the cap 36 fits. The cap 36 is provided with a center aperture through which the centering pin 14 is inserted and pressed into the hole 17 whereby the centering pin holds the cap 36 over the recess. As explained with reference to Figures 7 and 8, the stud shown in Figures 9 and 10 has an annular partition 35 which separates the flux in the two recesses 13 and 26 in order to prevent too large a pool occurring throughout the entire end surface of the stud.

Figure 11:
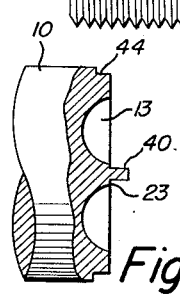
Figure 11 is a still further modified form of the invention.
Figure 12:
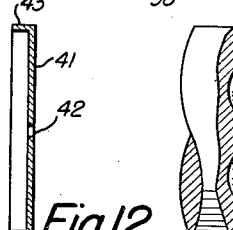
Figure 12 is a cross-section view of a modified cap for use with the stud in Figure 11.
Figure 13:
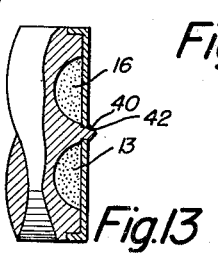
Figure 13 is a view with the flux and cap assembled on the end of the stud in Figure 11.

In Figures 11, 12 and 13, a further modified stud is shown and in this modification an integral tip 40 is provided on the shoulder 23. A modified cap 41 having an aperture 42 fits over the end of the stud to confine the flux in the annular recess 13. As shown in Figure 13, the integral tip 40 is upset and serves as a rivet to hold the cap 41 on the end of the stud. The cap 41 has an annular flange 43 which fits over a peripheral notch 44 to confine the flux into the recess 13. The integral tip 40 may be employed in the previous views instead of the pin 14 for the purpose of holding the cap over the recess. When the cap and pin are made of metals, such as indicated above, which have a boiling point lower than that of the steel or iron stud, the immediate establishment of a good arc is greatly facilitated. The metal readily volatilizes and this volatilization ionizes the gas and therefore facilitates the establishment of a good electrical arc the instant that the arc is initially struck.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A weldable element having an end provided with a recess, flux means in said recess, a cap for said recess to confine the flux means, said weldable element having at said end separate means extending beyond said cap to facilitate location of said weldable element, said separate means engaging and securing said cap to said end.

2. A weldable element having an end provided with a recess, flux means in said recess, a cap for said recess to confine the flux means, said cap having an aperture extending therethrough, said weldable element having at said end separate means projecting through said aperture and extending beyond said cap to facilitate location of said weldable element, said separate means engaging and securing said cap to said end.

3. A weldable element having an end provided with a recess, flux means in said recess, a cap for said recess to confine the flux means, said cap having an aperture extending therethrough, and separate means extending through said aperture and engaging said cap and said end to secure said cap to said end.

4. A weldable element having an end provided with an annular wall defining a recess, flux means in said recess, a cap for said recess to confine the flux means, said cap having an annular edge fitting within the annular wall, said weldable element having means spaced inwardly from said annular wall engaging said cap and securing said cap to said end.

5. A weldable element having an end provided with an annular wall defining a recess, flux means in said recess, a separate cap for said recess to confine the flux means, said cap having an annular edge fitting within the annular wall, said cap having an aperture extending therethrough, said weldable element having means at said end projecting through said aperture and extending beyond said cap to facilitate location of said weldable element, and said projecting means engaging and securing said cap to said end.

6. A weldable element having an end provided with first and second recesses, flux means in said recesses, first and second caps, respectively, for said first and second recesses and fastened to said weldable element to confine the flux means, said weldable element having means at said end projecting beyond said caps to facilitate location of said weldable element.

7. A weldable element having an end provided with first and second recesses, flux means in said recesses, first and second caps, respectively, for said first and second recesses, said weldable element having means at said end projecting beyond said caps to facilitate location of said weldable element, said projecting means engaging and securing said second cap to said end, and means to engage and secure said first cap to said end.

8. A weldable element having an end provided with outer and inner annular walls radially spaced from each other and defining an annular recess, flux means in said recess, an annular cap for said recess to confine the flux, said cap having a centrally disposed portion extending across said end, said centrally disposed portion having an aperture, said weldable element having means at said end projecting through said aperture and extending beyond said cap to facilitate location of said weldable element, said projecting means securing said cap to said end.

9. A weldable element having an end provided with chamber means and flux material in said chamber means, said weldable element having at said end a metal annular partition separating said chamber means into two annular chamber parts.

10. A weldable element having an end provided with a recess, flux means in said recess, a cap for said recess to confine the flux means, said weldable element having means at said end projecting beyond said cap to facilitate location of said weldable element, said projecting means comprising a pin anchored in a hole in said end of said weldable element, said anchored pin engaging said cap to secure said cap to said end.

11. A weldable element having an end provided with a recess, flux means in said recess, a cap for said recess to confine the flux means, said cap having an aperture extending therethrough, said weldable element having means at said end projecting through said aperture and extending beyond said cap to facilitate location of said weldable element, said projecting means engaging and securing said cap to said end and being integral with said weldable element.

12. A weldable element having an end provided with a recess, flux means in said recess, a cap for said recess to confine the flux means, said cap having an aperture extending therethrough, said weldable element having projecting means at said end, said projecting means comprising shoulder means and fastening means, said fastening means extending from said shoulder means through said aperture and beyond said cap, said fastening means engaging and securing said cap to said weldable element with said cap resting on said shoulder means, said recess comprising an annular groove surrounding said projecting means.

13. A weldable element having an end provided with a recess, flux means in said recess, a cap for said recess to confine the flux means, said weldable element having at said end separate means extending beyond said cap to facilitate location of said weldable element, said separate means engaging and securing said cap to said end, said separate means being made of metal having a lower melting point and a greater conductivity than that of the weldable element and being of a class including at least magnesium, copper, aluminum, tin, silver, zinc, gold, lead, lithium, beryllium, antimony and their alloys.

References Cited in the file of this patent

UNITED STATES PATENTS

| | | |
|---|---|---|
| 2,373,812 | Coop | Apr. 17, 1945 |
| 2,402,659 | Nelson | June 25, 1946 |
| 2,413,370 | Palmer | Dec. 31, 1946 |
| 2,441,257 | Candy | May 11, 1948 |
| 2,455,244 | Evans | Nov. 30, 1948 |
| 2,506,747 | Smith | May 9, 1950 |
| 2,612,394 | Nelson | Sept. 30, 1952 |